(12) United States Patent
Phelps et al.

(10) Patent No.: US 8,787,537 B2
(45) Date of Patent: Jul. 22, 2014

(54) IVR COMMUNICATION SESSION ROUTING AND RECORDING

(75) Inventors: David E. Phelps, Colorado Springs, CO (US); Brian S. Badger, Divide, CO (US); John Macedo, Clearwater, FL (US); Gregory J. Bjornberg, Colorado Springs, CO (US); John Rivera, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 169 days.

(21) Appl. No.: 13/323,075

(22) Filed: Dec. 12, 2011

(65) Prior Publication Data

US 2013/0148792 A1      Jun. 13, 2013

(51) Int. Cl.
*H04M 11/00* (2006.01)
(52) U.S. Cl.
USPC .................. 379/88.18; 379/88.22; 379/88.25; 379/88.26
(58) Field of Classification Search
USPC ........................ 379/88.18, 88.25, 88.26, 88.22
See application file for complete search history.

(56) References Cited

U.S. PATENT DOCUMENTS

| | | | |
|---|---|---|---|
| 2008/0089489 A1* | 4/2008 | Katkam et al. | 379/88.13 |
| 2008/0226040 A1* | 9/2008 | Liu et al. | 379/67.1 |
| 2010/0290600 A1* | 11/2010 | Agranovsky et al. | 379/88.18 |
| 2011/0116492 A1* | 5/2011 | Byron et al. | 370/352 |

* cited by examiner

*Primary Examiner* — Gerald Gauthier
*Assistant Examiner* — Simon King

(57) ABSTRACT

A method may include receiving, by a computing device, a communication session invitation from a user device and determining, by the computing device, whether a communication session, corresponding to the communication session invitation, is to be recorded. The method may also include, when the communication session is to be recorded, identifying, by the computing device, a record mode, corresponding to the communication session, from a group of record modes. The method may further include establishing, by the computing device, recording services corresponding to the record mode, and establishing, by the computing device, the communication session with the user device. The method may also include, when the communication session is not to be recorded, establishing, by the computing device, the communication session with the user device.

20 Claims, 12 Drawing Sheets

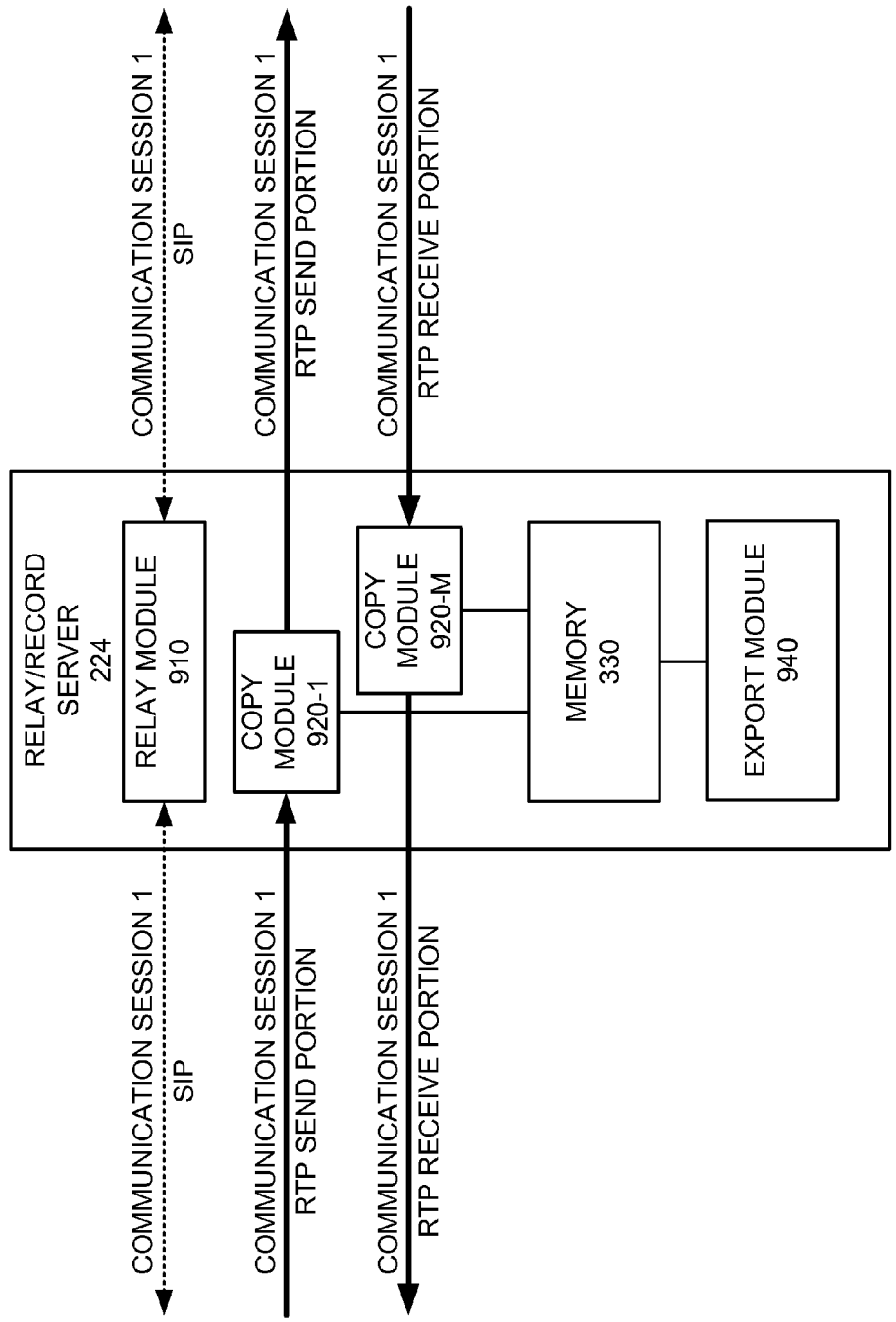

IVR COMMUNICATION SESSION ROUTING AND RECORDING

BACKGROUND

Currently available telecommunication technologies enable individuals and organizations to communicate in a variety of ways. For example, many companies and other organizations maintain call centers that individuals may call to gain access to customer service, sales support, product support, technical support, or other types of services. Some call center services include an automated component capable of providing callers with basic services and information, and an agent component for more complex or personalized information and services. Additionally, some call centers attempt to ensure quality control by monitoring or recording calls. However, such attempts often include several deficiencies. Examples of such deficiencies include an inability to adapt recording capabilities to particular systems and/or scenarios.

BRIEF DESCRIPTION OF THE DRAWINGS

FIGS. 9A-9C are diagrams of example relay/record servers according to one or more implementations described herein.

DETAILED DESCRIPTION OF PREFERRED EMBODIMENTS

The following detailed description refers to the accompanying drawings. The same reference numbers in different drawings may identify the same or similar elements.

In one or more implementations, described herein, devices may be used to dynamically manage the recording of communication sessions involving interactive voice response (IVR) services.

Figure 1:
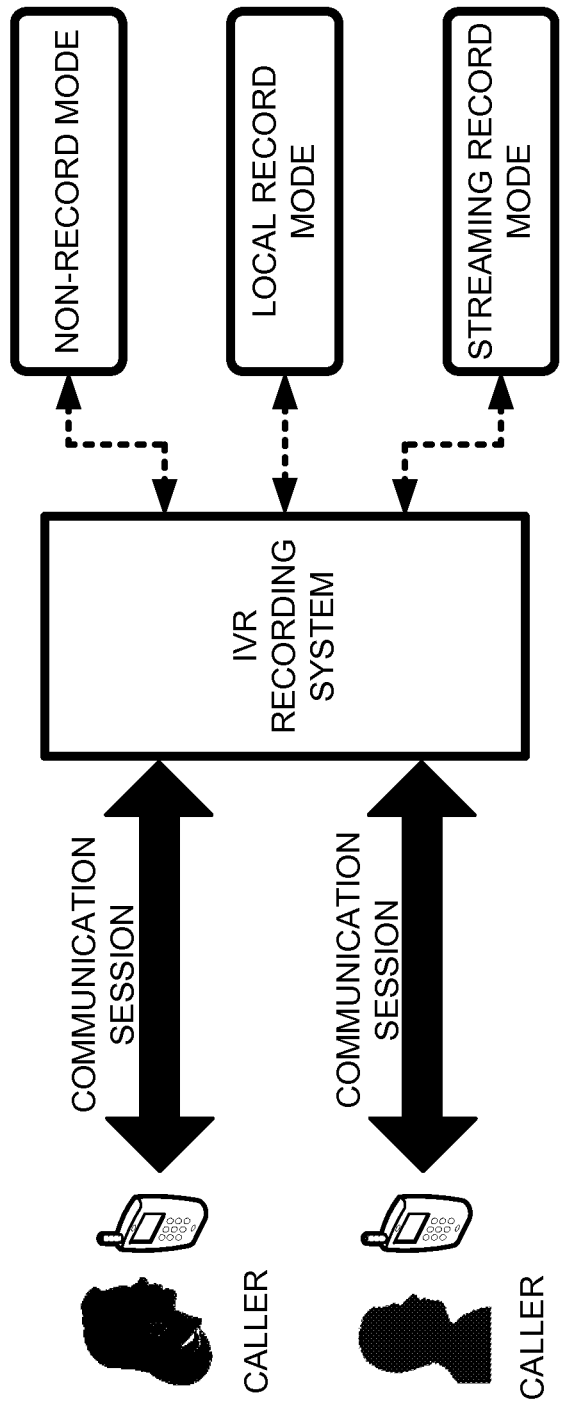
FIG. 1 is a diagram of an overview of an implementation described herein.

FIG. 1 is a diagram of an overview of an implementation described herein. As depicted, a caller may user a telephone or other type of user device (also referred to herein as "UE") to call or otherwise establish a communication session with an IVR recording system. The IVR recording system may communicate with the caller using a bank or library of automated responses that may depend on, and/or prompt, one or more inputs from the caller. Examples of such inputs may include the caller speaking into a microphone of the telephone, pressing one or more buttons on the telephone, or another type of user input.

In addition to communicating with the caller, the IVR recording system may be capable of operating in one or more recording modes. For example, as depicted in FIG. 1, the IVR recording system may be capable of operating in a non-record mode, a local record mode, and/or a streaming record mode. In a non-record mode, the IVR recording system may provide IVR-related services without recording some or all of the communication session. In a local record mode, the IVR recording system may provide IVR-related services and record some or all of the communication session locally. In the streaming record mode, the IVR recording system may provide IVR-related services and stream some or all of the communication to an external recording device.

As such, the IVR recording system may be capable of providing recording capabilities according to the needs and/or preferences of surrounding systems or conditions. For example, in a network that does not include any recording capabilities, the IVR recording system may operate in a local record mode to provide recording capabilities to the network. In a network that provides one or more external recording systems, IVR recording system may operate in a streaming record mode so that communication sessions are recorded by one or more of the external recording systems. In another network, IVR recording system may transition from one recording mode to another recording mode in order to, for example, avoid recording certain communication sessions, record certain communication sessions locally, and/or stream certain communication sessions to external recording systems. Accordingly, one or more of the implementations described herein may provide solutions to recording communication sessions depending on the needs, preferences, or circumstances of surrounding networks or devices.

Figure 2:
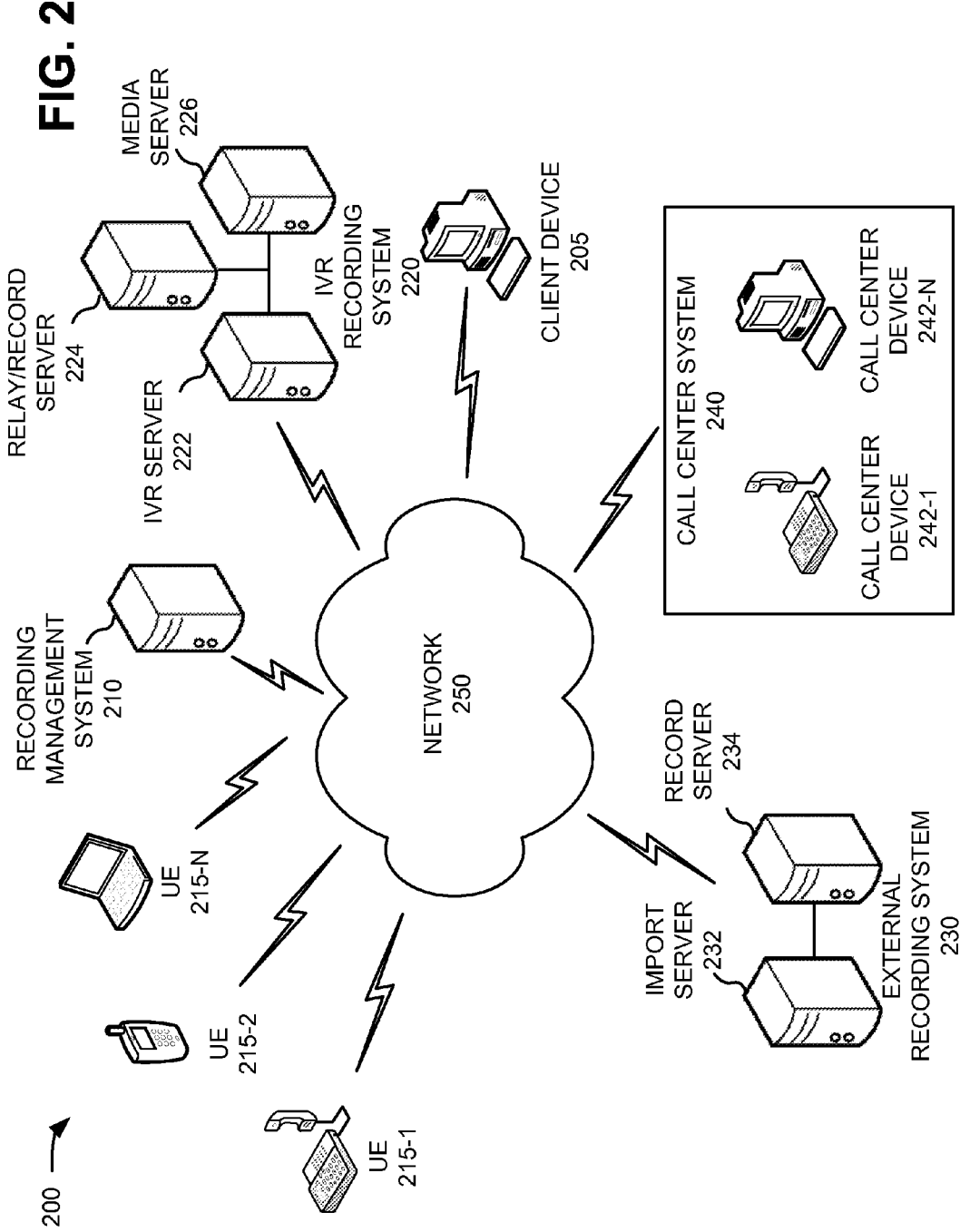
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include client device 205, recording management server 210, UEs 215-1, 215-2, . . . , 215-N (where N≥1) (collectively referred to as "UEs 215," and individually as "UE 215"), IVR recording system 220, external recording system 230, call center system 240, and network 250. While FIG. 2 shows a particular number and arrangement of systems, networks, and devices, in alternative implementations, environment 200 may include additional systems, networks or devices, fewer systems, networks or devices, different systems, networks or devices, or differently arranged systems, networks or devices than those depicted. Moreover, one or more systems, networks, or devices may perform a task described as being performed by another system, network, or device.

Client device 205 may include one or more of a variety of computing or communication devices. For instance, client device 205 may include a smart phone, a laptop computer, a tablet computer, a desktop computer, a personal data assistant (PDA), and/or another type of computing or communication device. Client device 205 may be capable of operating in a manner that is consistent with the systems, environments, devices, processes, and operations described herein. For example, client device 205 may communicate record orders (e.g., instructions to record one or more communication sessions or one or more types of communication sessions) to recording management system 210. Client device 205 may also, or alternatively, be capable of receiving recording information from recording management system 210.

Recording management system 210 may include one or more of a variety of computing or communication devices.

For example, recording management system 210 may include a desktop computer, a server, a cluster of servers, or another type of computing or communication device. In some implementations, for example, recording management system 210 may include a transaction server, a storage device that stores record metadata and/or record data, a web server, and/or one or more other types of computing or communication devices. Additionally, or alternatively, recording management server 210 may be capable of operating in a manner that is consistent with the systems, environments, devices, processes, and operations described herein. For instance, recording management system 210 may receive record orders from client device 205, communicate record orders to IVR recording system 220, monitor record orders, provide client device 205 with record order updates, and perform other functions or operations described herein.

UE 215 may include a variety of computing devices. For example, UE 215 may include a telephone, a smart phone, a laptop computer, a tablet computer, a desktop computer, a personal data assistant (PDA), and/or another type of computing or communication device. UE 215 may call or otherwise establish a communication session with IVR recording system 220 via network 250.

IVR recording system 220 may include a computer, a server, a cluster of servers, or another type of computing or communication device. For example, as illustrated, IVR recording system 220 may include IVR server 222, relay/record server 224, and media server 226. IVR server 222 may, for example, provide IVR services to communication sessions and/or provide other services relating to communication sessions. Relay/record server 224 may, for example, provide various services, such as recording communication sessions, communicating communication session recordings to external recording system 230, streaming communication sessions to external recording system 230, and/or updating IVR server 222 with requests to record communication sessions (e.g., call orders). Relay/record server 224 may also provide additional services, including cooperating with IVR server 222 to establish recordable communication sessions, collecting usage information for billing purposes, or other services. Media server 226b may provide audio tracks and/or other types of media for IVR services.

IVR recording system 220 may enable a communication session, or portion thereof, to be recorded. For example, IVR recording system 220 may enable a communication session to be recorded by recording the communication session locally and communicating the recorded communication session to external recording system 230. In another example, IVR recording system 220 may enable a communication session to be recorded by establishing a connection with external recording system 230 and streaming the communication session to external recording system 230.

In another example, IVR recording system 220 may enable a communication session to be recorded by out-dialing the communication session to call center system 240. Out-dialing a communication session may include various operations (e.g., a dial-out operation, a forwarding operation, a call session patching operation, etc.) capable of placing UE 215 in communication with call center system 240. Additionally, or alternatively, out-dialing a communication session may cause a communication session tap to be placed on the communication session, which may enable the communication session to be recorded by external recording system 230. IVR recording system 220 may include an Internet Protocol (IP) IVR system or an IVR system based on another type of technology such as an IVR recording system connected to a public switched telephone network (PSTN) communication system.

External recording system 230 may include computing devices, such as a computer, a server, a cluster of servers, or another type of computing device. Additionally, or alternatively, external recording system 230 may include a router, a switch, a modem, a LAN, a virtual network, a wireless network, or other types of networks and/or network devices. For instance, as illustrated, external recording system 230 may include import server 232 and record server 234. Import server 234 may be capable of receiving data, corresponding to a communication session, from IVR system 220 and/or call center system 240. Examples of such data may include non-transitory data structures, such as record metadata, record data, and/or other call-related information.

Record server 234 may be capable of receiving and recording a data stream corresponding to a communication session from IVR recording system 220. In some implementations, record server 236 may also, or alternatively, communicate with IVR server 222 to establish a routing path for communicating the data stream from IVR recording system 220. In certain implementations, record server 236 may also, or alternatively, communicate with IVR recording system 220 to specify a time, a protocol, a manner, a form, or a format for communicating a data stream of a communication session.

Call center system 240 may include one or more of a variety of networks and/or devices. For example, call center system 240 may include a computer, a server, a cluster of servers, a telephone, a cellular telephone, a router, a switch, a local area network (LAN), a wireless network, a virtual network, or another type of network or device. As depicted, call center system 240 may also, or alternatively, include call center devices 242-1, . . . , 242-M (where M≥1) (collectively referred to as "call center devices 242," and individually as "call center device 242"), including computers, telephones, and other devices, which may be used by agents of call center system 240 to receive and service out-dialed communication sessions from IVR recording system 220. Call center system 240 may be a single call center located in a single geographic area and/or multiple call centers distributed across a geographic area.

Network 250 may be any type of network or combination of networks. For example, network 250 may include a LAN, a wide area network (WAN) (e.g., the Internet), and/or a telecommunications network (e.g., Long-Term Evolution (LTE) network, Global System for Mobile Communications (GSM) network, wideband code division multiple access (WCDMA) network, Universal Mobile Telecommunications System (UMTS) network, Code Division Multiple Access 2000 (CDMA2000) network, High-Speed Packet Access (HSPA) network, Worldwide Interoperability for Microwave Access (WiMax) network, etc.).

Additionally, or alternatively, network 250 may include a fiber optic (e.g., a FiOS) network, a metropolitan area network (MAN), an ad hoc network, a telephone network (e.g., a PSTN), a cellular network, or a voice over internet protocol (Voice over IP, VoIP) network. Network 250 may also, or alternatively, include additional networks, systems, devices, and/or other technologies to enable communications between client device 205, recording management system 210, UEs 215, IVR recording system 220, external recording system 230, and/or call center system 240.

Figure 3:
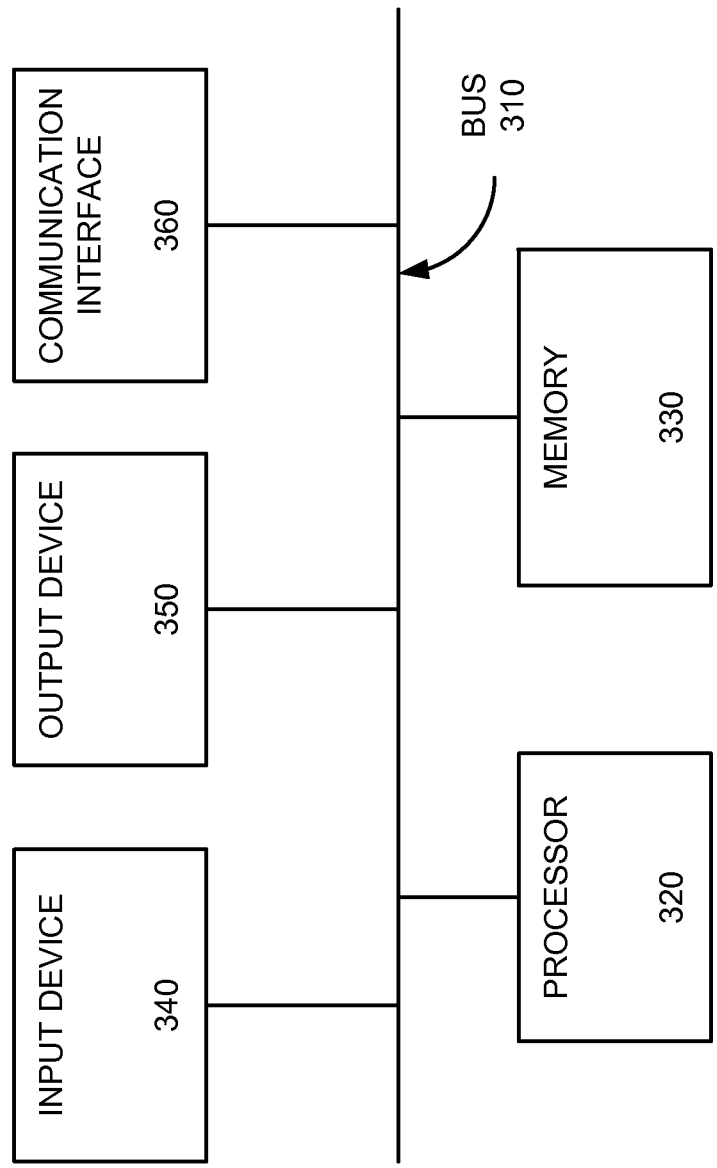
FIG. 3 is a diagram of example components of a device that may be used within the environment of FIG. 2.

FIG. 3 is a diagram of example components of a device 300 that may be used within environment 200 of FIG. 2. Device 300 may correspond to one or more of client device 205, recording management system 210, UE 215, IVR server 222, relay/record server 224, media server 226, import server 232, record server 234, and/or call center device 242. For example, in some implementations, client device 205, recording management system 210, UE 215, IVR server 222, relay/record server 224, media server 226, import server 232, record server 234, and/or call center device 242 may each include the components of FIG. 3; however, in other implementations, the components of FIG. 3 may be used to implement a combination of client device 205, recording management system 210, UE 215, IVR server 222, relay/record server 224, media server 226, import server 232, record server 234, and/or call center device 242. Further, each of client device 205, UE 215, IVR server 222, relay/record server 224, media server 226, import server 232, record server 234, and/or call center device 242 may include one or more devices 300.

As depicted, device 300 may include bus 310, processor 320, memory 330, input device 340, output device 350, or communication interface 360. However, the precise components of device 300 may vary between implementations. For example, depending on the implementation, device 300 may include fewer components, additional components, different components, or differently arranged components than those illustrated in FIG. 3.

Bus 310 may include one or more component subsystems and/or communication paths that enable communication among the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 320 may control the overall operation, or a portion thereof, of device 300, based on, for example, an operating system and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks (e.g., network 250). For example, communication interface 360 may include some type of wireless or wired interface. Communication interface 330 may also include an antenna (or a set of antennas) that permit wireless communication, such as the transmission and reception of radio frequency (RF) signals.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
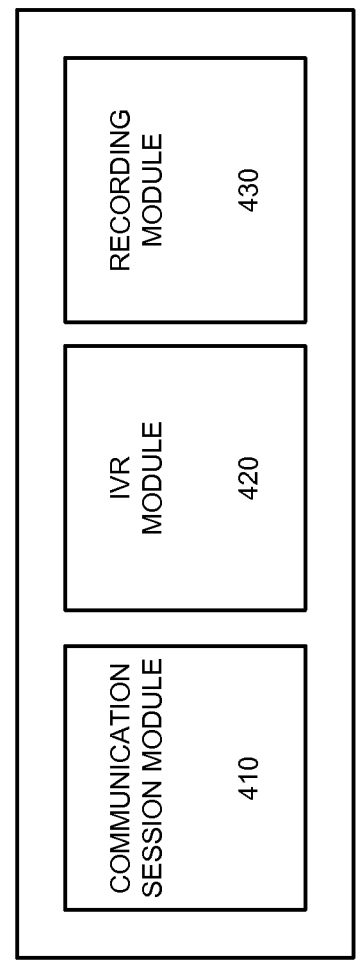
FIG. 4 is a diagram of example functional components of an interactive voice response (IVR) recording system according to one or more implementations described herein.

FIG. 4 is a diagram of example functional components of an IVR recording system 220 according to one or more implementations described herein. As illustrated, IVR recording system 220 may include communication session module 410, IVR module 420, and recording module 430. Depending on the implementation, one or more of modules 410-430 may be implemented as a combination of hardware and software based on the components illustrated and described with respect to FIG. 3. Alternatively, modules 410-430 may each be implemented as hardware based on the components illustrated and described with respect to FIG. 3.

Communication session module 410 may provide functionality with respect to communication sessions. For example, communication session module 410 may enable IVR recording system 220 to establish a communication session with UE 215. Communication session module 410 may also, or alternatively, enable IVR recording system 220 to determine or ascertain information regarding the caller, UE 215, or one or more other characteristics regarding a communication session. In some implementations, for example, communication session module 410 may obtain such information and use the information to cooperate with IVR module 420 and/or recording module 430 to help determine what types of IVR services and/or recording services are to be applied to a particular communication session.

IVR module 420 may provide functionality with respect to IVR services. For example, IVR module 420 may enable IVR recording system 220 to provide IVR services to a communication session. In some implementations, IVR module 420 may include, or have access to, a repository of logical instructions and/or media files that may be used by IVR recording system 220 to provide IVR services to a particular communication session. In certain implementations, the functionality provided by IVR module 420 may be distributed among one or more devices of IVR recording system 220. For example, IVR server 222 may include a set of logical instructions for corresponding with a particular caller during a communication session, and media server 226 may include a repository of media files (e.g., audio files) that may be played or otherwise used to provide information to or elicit information from the caller.

Recoding module 430 may provide functionality with respect to recoding communication sessions. For example, recording module 430 may enable IVR recording system 220 to record a communication session. Additionally, or alternatively, recording module 430 may enable IVR recording system 220 to operate in one or more recording modes. For example, recording module 430 may enable IVR recording system 220 to operate in a non-record mode, a local record mode, and/or a streaming record mode. As mentioned above, in a non-record mode, IVR recording system 220 may provide IVR-related services without recording some or all of the communication session. In a local record mode, IVR recording system 220 may provide IVR-related services and record some or all of the communication session locally. In the streaming record mode, IVR recording system 220 may provide IVR-related services and stream some or all of the communication session to an external recording device, such as external recording system 230. Depending on the implementation, the external recording device may, or may not, actually record the portion of the communication session that is streamed to the external recording device.

In some implementations, recording module 430 may cooperate with, for example, communication session module 410 to record one or more types of communication sessions. For example, recording module 430 may cooperate with communication session module 410 to record communication sessions corresponding to a particular caller, communication sessions corresponding to a particular type of caller (e.g., callers of a particular geographic location, callers of a particular area code, callers of a particular demographic, etc.), communication sessions corresponding to a particular date or time, communication sessions corresponding to a particular UE 215, communication sessions corresponding to a particular type of UE 215 (e.g., smart phones), communication sessions corresponding to a particular type of input from the caller, communication sessions corresponding to a particular type of output to the caller, or one or more other types of communication sessions. In some implementations, recording module 430 may operate in accordance with one or more record orders received from client device 205 and/or recording management system 210.

Further, recording module 430 may enable IVR recording system 220 to transition from one type of record mode to another type of record mode depending on one or more factors. For example, recording module 430 may enable IVR recording system 220 to receive a record command from client device 205, or recording management system 210, and transition from a non-record mode to a local record mode with respect to one or more communication sessions identified in the record command. Additionally, or alternatively, recording module 430 many enable IVR recording system 220 to operate in a non-record mode with respect to certain communication sessions (or certain types of communication sessions), operate in a local record mode with respect to other communication sessions (or types of communication sessions), and/or operate in a streaming recording mode with respect to yet other communication sessions (or types of communication sessions). As such, recording module 430 enable IVR recording system 220 to provide a flexible solution to recording IVR-related communication sessions.

Additionally, or alternatively, recording module 430 may enable IVR recording system 220 to record one or more portions of a communication session. For instance, recording module 430 may record an IVR portion of a communication session, an agent portion of a communication session, information received from a caller of a communication session, information sent to a caller of a communication session, communication session content corresponding to an interval of time, or one or more other portions of a communication session. As such, recording module 430 may also, or alternatively, enable recording system 220 to provide solutions to recording certain portions of a communication session.

In addition to the functionality described above, functional components of recording management system 210 may also, or alternatively, provide functionality as described elsewhere in this description. For example, communication session module 430 may enable a user of client device and/or another device to listen to one or more ongoing communication sessions or one or more recorded communication sessions. In another example, recording module 430 may also, or alternatively, enable IVR recording system 220 to export or otherwise send locally recorded communication sessions (e.g., audio files) to one or more other devices, such as external record system 230. Further, while FIG. 4 shows a particular number and arrangement of modules, in alternative implementations, recording management system 210 may include additional modules, fewer modules, different modules, or differently arranged modules than those depicted.

Figure 5:
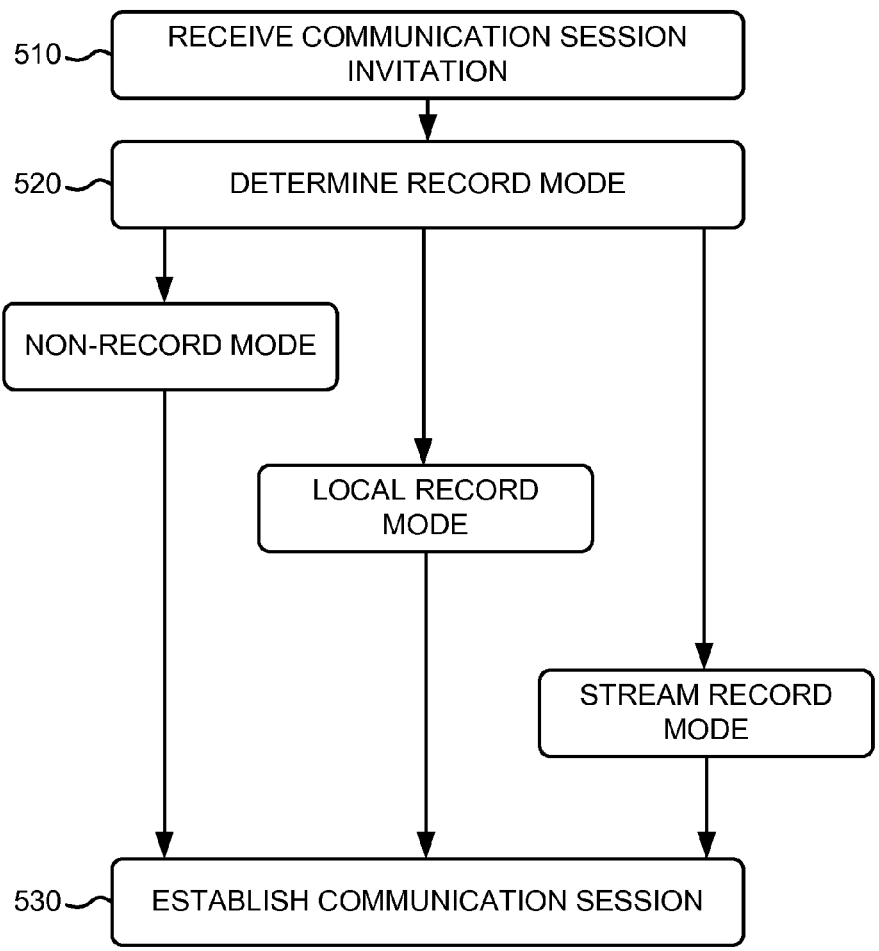
FIG. 5 is a diagram of an example process for recording a communication session in accordance with one or more implementations described herein.

FIG. 5 is a diagram of an example process 500 for recording a communication session in accordance with one or more implementations described herein. In one or more implementations, some or all of process 500 may be performed by one or more components of IVR recording system 220. In other implementations, some or all of process 500 may be performed by one or more other components/devices, or a group of components/devices, including or excluding IVR recording system 220.

A communication session invitation may be received (block 510). For example, IVR recording system 220 may receive a communication session invitation. In some implementations, IVR recording system 220 may receive the communication session invitation from UE 215. Additionally, or alternatively, IVR record system 220 may receive the communication session invitation in the form of a session initiation protocol (SIP) message, such as a SIP INVITE message.

A record mode may be determined (block 520). For instance, IVR recording system 220 may determine a record mode corresponding to the communication session invitation. In some implementations, IVR recording system 220 may determine the record mode, corresponding to a particular communication session invitation, based on a record order, or another type or request, received from client device 205 and/or recording management system 210. For instance, a record order, or another type of request, may instruct IVR recording system 220 to record communication sessions corresponding to a particular caller, communication sessions corresponding to a particular type of caller, communication sessions corresponding to a particular date or time, communication sessions corresponding to a particular UE 215, communication sessions corresponding to a particular type of UE 215, or one or more other types of communication sessions. In some implementations, IVR recording system 220 may determine whether to record a particular communication session, or determine which record mode to apply, based on a comparison between the communication session invitation and one or more record records.

As depicted in the example process of FIG. 5, the record mode may be a non-record mode, a local record mode, or a stream record mode. As mentioned above, in a non-record mode, IVR recording system 220 may provide IVR-related services without recording some or all of the communication session. In a local record mode, IVR recording system 220 may provide IVR-related services and record some or all of the communication session locally. In the streaming record mode, IVR recording system 220 may provide IVR-related services and stream some or all of the communication to an external recording device.

A communication session may be established (block 530). For example, IVR recording system 220 may establish a communication session with UE 215. In some implementations, IVR recording system 220 may establish the communication session based on the record mode. For instance, for the non-record mode, IVR recording system 220 may establish the communication session by creating a communication session route or path that does not include record/relay server 224. For the local record mode and/or the streaming record mode, IVR record system 220 may establish a communication session by creating a communication session route that includes record/relay server 224. These and other features of the non-record mode, the local record mode, and the streaming record mode are described in greater detail below with reference to FIGS. 6-9.

While FIG. 5 shows a flowchart diagram of an example process 500 for recording a communication session, in other implementations, a process for recording a communication session may include fewer operations, different operations, differently arranged operations, or additional operations than depicted in FIG. 5.

Figure 6A:
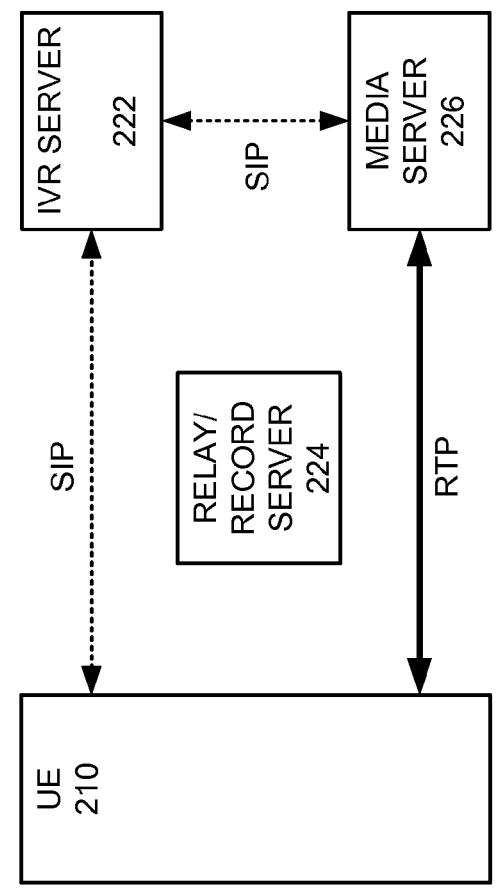
FIGS. 6A-6C are diagrams of example communication sessions according to one or more implementations described herein.

FIG. 6A is a diagram of an example communication session 600A according to one or more implementations described herein. As illustrated, a communication session may include a signaling protocol (e.g., SIP) path (also referred to herein as a route) and a transport protocol (e.g., a real-time transport protocol (RTP)) path. The signaling protocol path may be used to, for example, address setup and signaling aspects of the communication session, and the transport protocol path may be used to, for example, address media aspects of the communication session.

A signaling protocol path may be directed from UE 210 to IVR server 222. Similarly, a transport protocol path may be directed from UE 210 to media server 225. A signaling protocol path may also exist between IVR server 222 and media server 225. Communication session 600A does not include a protocol path or a transport protocol path directed to relay/record server 224. Communication session 600A, therefore, may be an example of IVR recording system 220 operating in a non-record mode, or, in other words, a communication session that may receive IVR services via IVR server 222 and media server 226, but not recording services since the communication session is not routed to relay/record server 224.

Figure 6B:
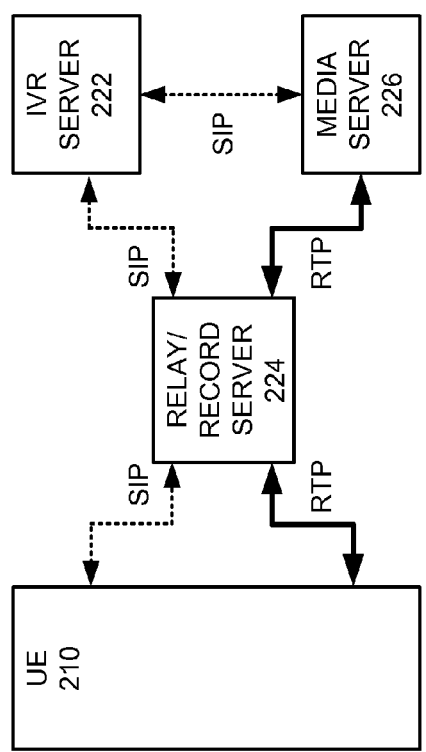

FIG. 6B is a diagram of another example communication session 600B according to one or more implementations described herein. As depicted, a signaling protocol (e.g., SIP) path between UE 210 and IVR server 222 may be routed through relay/record server 224. Similarly, a transport protocol (e.g., RTP) path between UE 210 and media server 226 may be routed through relay/record server 224. A signaling protocol path may also exist between IVR server 222 and media server 226. The depicted communication session 600B may correspond to a scenario where, for example, IVR recording system 220 (not shown) is operating in a local record mode, or, in other words, recording a communication session. In some implementations, a recording route, as described herein, may include signaling protocol paths and transport protocol paths as depicted in FIG. 6B.

Figure 6C:
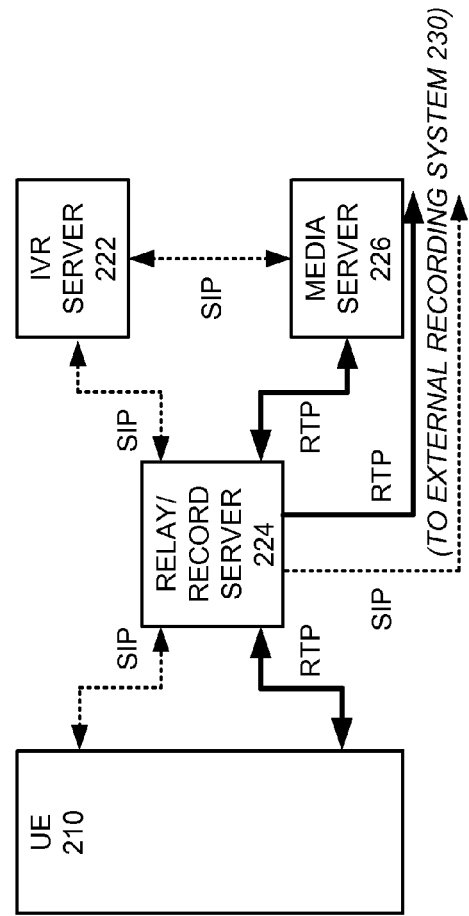

FIG. 6C is a diagram of another example communication session 600C according to one or more implementations described herein. Similar to the communication session of FIG. 6B, communication session 600C includes a signaling protocol (e.g., SIP) path and a transport protocol (e.g., RTP) path that are routed through relay/record server 224. However, in contrast to FIG. 6B, communication session 600C also includes a signaling protocol path and a transport protocol path leading from relay/record server 224 to external recording system 230. Communication session 600C may correspond to a scenario where, for example, IVR recording system 220 is operating in a streaming record mode, or, in other words, streaming a communication session to external recording system 230 or to another type of external recording system or device. In some implementations, a recording route, as described herein, may include signaling protocol paths and transport protocol paths as depicted in FIG. 6C. In some implementations, IVR recording system 220 may receive a request from a device, such as client device 205, to transition from one record mode to another record mode. In such implementations, IVR recording system 220 may reestablish one or more of the routing paths or communication paths discussed herein.

Figure 7:
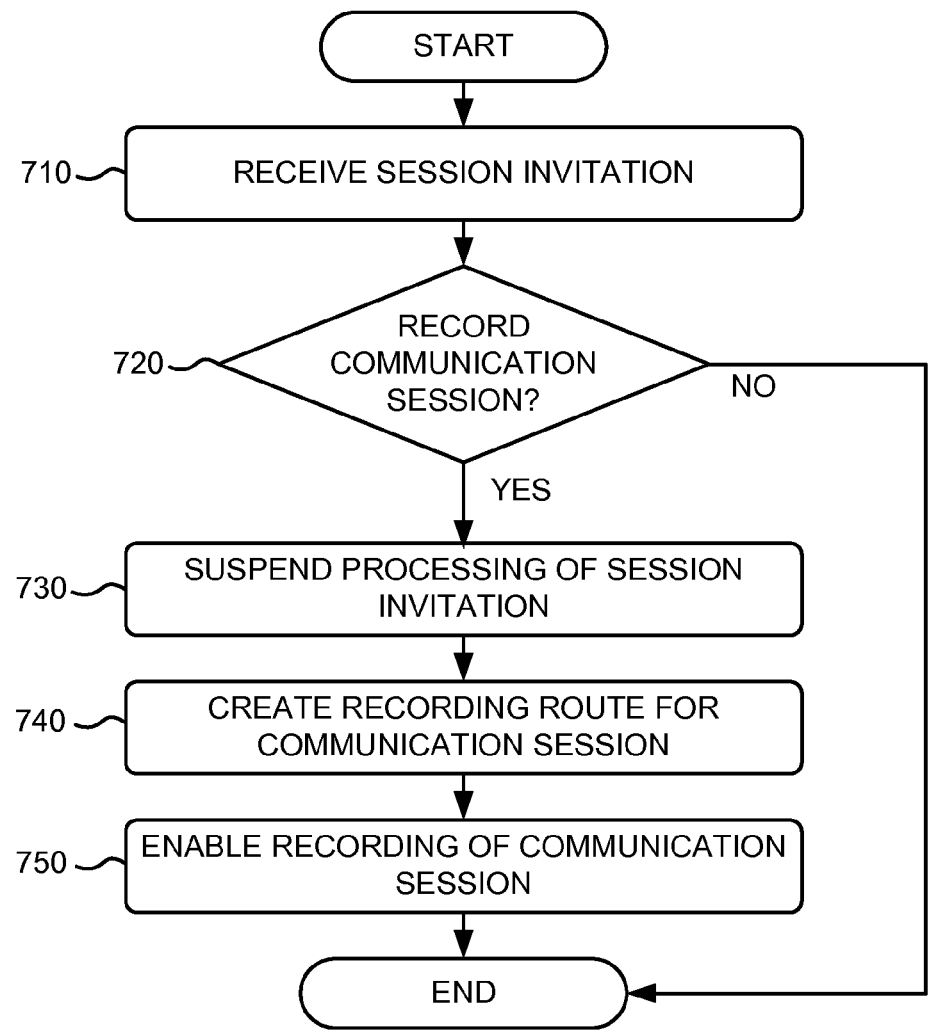
FIG. 7 is a diagram of an example process for recording a communication session according to one or more implementations discussed herein.

FIG. 7 is a flowchart diagram of an example process 700 for recording a communication session according to one or more implementations discussed herein. In one or more implementations, some or all of process 700 may be performed by one or more components of IVR recording system 220. In other implementations, some or all of process 700 may be performed by one or more other components/devices, or a group of components/devices, including or excluding IVR recording system 220.

Process 700 may include receiving a session invitation (block 710). For example, IVR recording system 220 may receive an invitation from UE 210 to establish a communication session with UE 210. In some implementations, a session invitation may include a SIP INVITE message.

A determination may be made about whether to record the communication session or portion thereof (block 720). For instance, IVR recording system 220 may determine whether to record a communication session locally. In some implementations, the determination may be based on whether any record requests, record orders, record policies, and/or call plans have been received for the corresponding communication session. For instance, if a previously received order or calling plan indicates that a communication session should be recorded, then IVR recording system 220 may determine that the corresponding communication session may be recorded (block 720—Yes). However, if, for example, a previously received order or calling plan does not indicate that the communication sessions should be recorded, then IVR recording system 220 may determine to not record the corresponding communication session (block 720—No).

A communication session may be suspended (block 730). For example, IVR recording system 220 may suspend the processing of a communication session when an incoming communication session will be recorded (block 720—Yes). In some implementations, suspending the processing of a communication session may include delaying a response to an invitation to establish a communication session. In some implementations, the processing of a communication session may be delayed until a relay invitation is received from a computing device capable of recording the communication session (see, for example, events 810-825 of FIG. 8).

A recording route for a communication session may be created (block—740). For example, IVR recording system 220 may configure or otherwise establish a route for recording a communication session or portion thereof. A recording route may include a signaling protocol (e.g., SIP) path and/or a transport protocol (e.g., RTP) path that is routed through relay/record server 224 (see, for example, FIGS. 6B-6C).

Recording for a communication session may be enabled (block 750). For example, IVR server 222 may communicate a message (e.g., a SIP INFO message) to relay/record server 224 to begin recording a communication session locally. As another example, IVR server 222 may communicate a message (e.g., a SIP INFO message) to relay/record server 224 to begin streaming the communication session to external recording system 230.

While FIG. 7 shows a flowchart diagram of an example process 700 for recording a communication session, in other implementations, a process for recording a communication session may include fewer operations, different operations, differently arranged operations, or additional operations than depicted in FIG. 7.

Figure 8:
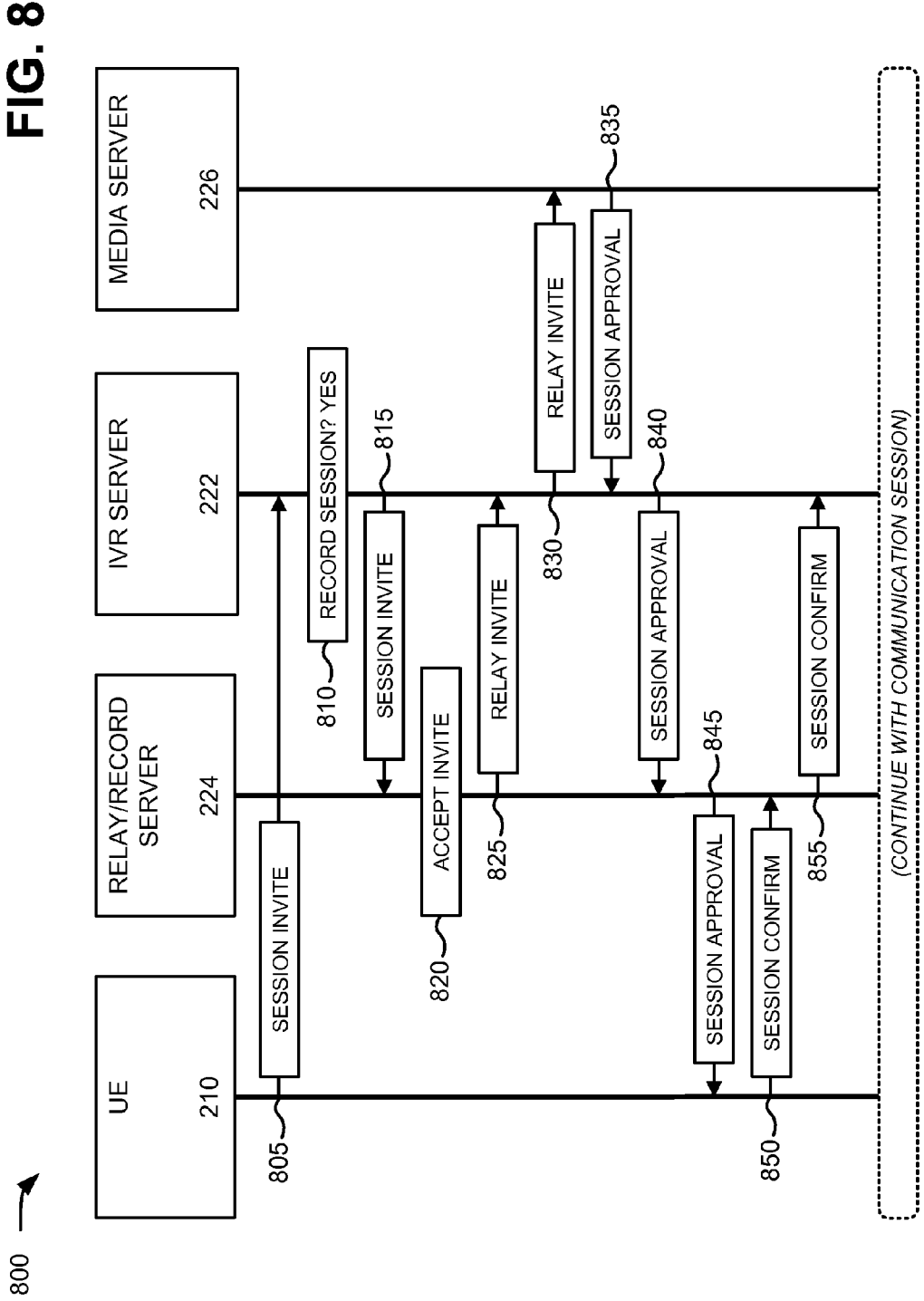
FIG. 8 is a diagram of a process for creating a recording route according to one or more implementations discussed herein.

FIG. 8 is a diagram of a process 800 for creating a recording route according to one or more implementations discussed herein. As illustrated, UE 210 may send a session invite message (e.g., a session invitation or a SIP INVITE message) to IVR server 222 (block 805). IVR server 222 may examine the session invite message and determine that the session, or portion thereof, will be recorded (block 810). IVR server 222 may communicate the session invite message to relay/record server 224 (block 815). Relay/record server 224 may accept the session invite message (block 820) and/or communicate a relay invite message to IVR server 222 (block 825). A relay invite message may include a message for setting-up a media relay, such as a SIP INVITE message that describes a media relay using session description protocol (SDP).

IVR server 222 may communicate the relay invite message to media server 226 (block 830), and media server 226 may respond with an approval message, which may, for example, include a SIP OK message or other non-final response (block 835). IVR server 222 may send a session approval message to relay/record server 224 (block 840), and relay/record server 224 may send a session approval message to UE 210 (block 845). UE 210 may communicate a session confirm message (e.g., a SIP acknowledgement (ACK) message) to relay/record server 224 (block 850), and relay/record server 224 may communicate a session confirm message to IVR server 222 (block 855). At this point, in some implementations, a recordable communication session has been established. Additionally, as depicted, process 800 may continue by, for example, recording the communication session locally, streaming the communication session to external recording system 230, or out-dialing the communication session to call center system 240.

In one example, when the communication session is to be recorded, IVR server 222 may establish the communication session by relaying the communication session via relay/record server 224 and associating call context information corresponding to communication session invention 805 to a call context associated with relay invitation 825. The call context information may include any type, variety, or combination of information relating to user UE 210, IVR server 222, relay/record server 224, media server 226, and/or the communication session. For instance, examples of the call context information may include information describing IVR services provided to UE 210, information indicating a current state of IVR services provided to UE 210, billing information corresponding to UE 210, information describing a recording status corresponding to the communication session, etc.

FIG. 9A is a diagram of an example relay/record server 224 according to one or more implementations described herein. As illustrated, relay/record server 224 may include relay module 910, copy modules 920-1, . . . , 920-M (where M≥1) (referred to collectively as "copy modules 920," and individually as "copy module 920"), memory 330, and export module 340. In some implementations, the modules 910-940 depicted in FIG. 9A may be implemented using one or more components of FIG. 3 or one or more modules of FIG. 4.

Figure 9B:
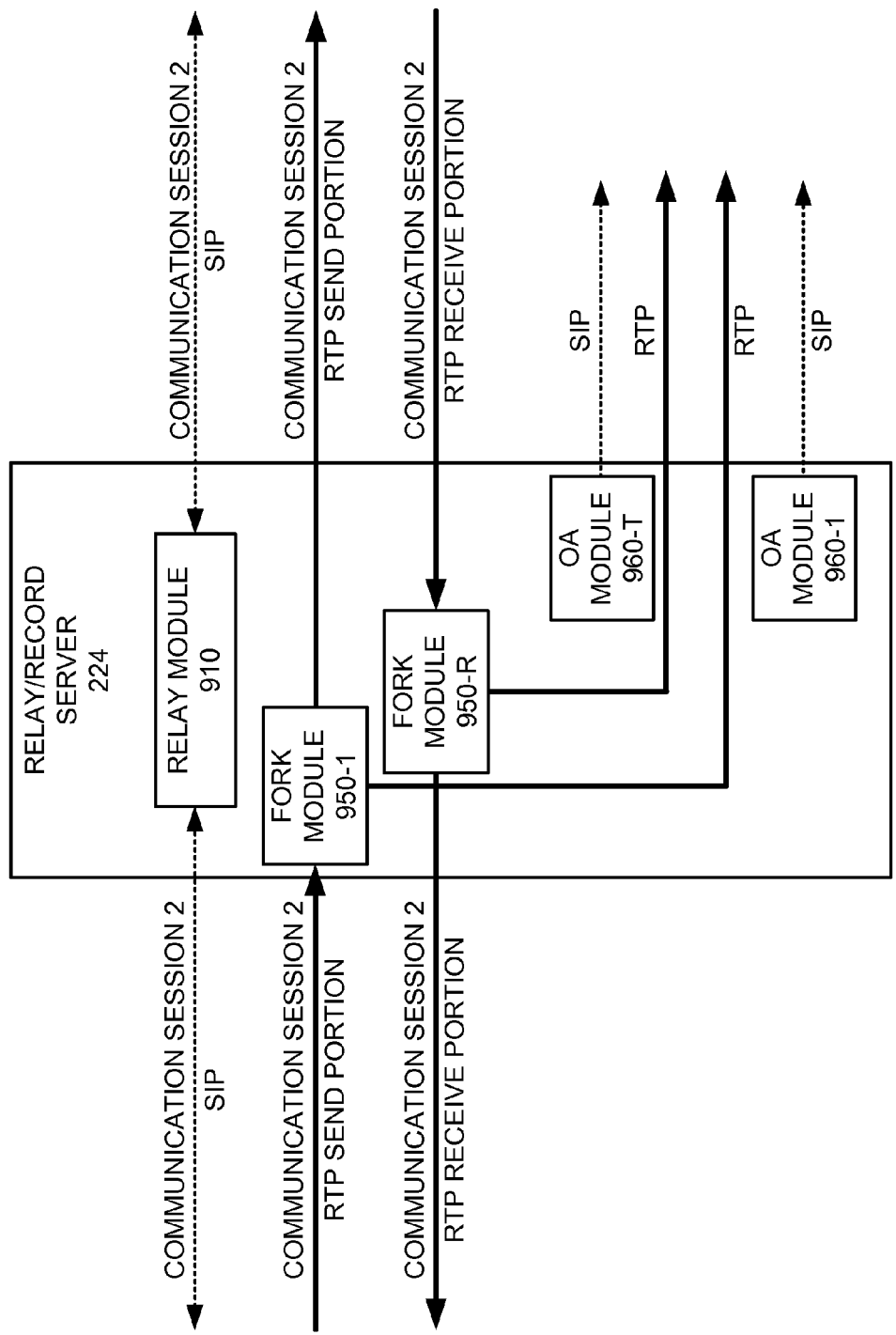

In addition, relay/record server 224 may include fewer modules, additional modules, different modules, or differently arranged modules than those illustrated in FIG. 9A. In another example, relay/record server 224 may include a communication module to receive real-time recording instructions from IVR server 120. In yet other implementations, relay/record server 224 of FIG. 9A may also, or alternatively, include one or more of the modules discussed below with respect to FIGS. 9B-9C.

Relay module 910 may provide communication session relay services. For example, relay module 910 may enable relay/record server 224 to operate as an end device (e.g., a terminating user agent (TUA)) for one portion of a communication session and as an originating device (e.g., originating user agent (OUA)) for another portion of the same communication session (see, for example, events 720, 725, 745, and 865 of FIG. 8). Said another way, relay module 910 may enable relay/record server 224 (or IVR recording system 220) to appear as a terminating agent to devices on a first portion of the communication session (e.g., a send portion) and an originating device to devices in a second portion of the communication session (e.g., a receive portion). In some implementations, this may enable IVR recording system 220 to dynamically provide communication session recording services by including or excluding relay/record server 224 from a routing path of the communication session.

Copy modules 920 may capture or otherwise record a communication session, or portion thereof, in a non-transitory data structure, such as a media file. For example, copy modules 920 may enable relay/record server 224 to receive communication session streams in transport protocol (e.g., RTP) paths and capture or otherwise record the communication session streams as one or more electronic media files (e.g., a waveform audio (WAV) file, a moving picture experts group-2 audio layer III (MPEG-2 Audio Layer III (MP3)) file, an audio interchange file format (AIFF)/file, an audio file format (Au file format) file, a pulse-code modulation (PCM) format file, etc.). As illustrated, a communication session may be divided into multiple communication session streams, including a send portion of the communication session and a receive portion of the communication session. Relay/record server 224 may operate to record one or more of the communication session streams. Copy modules 920 may also, or alternatively, convert data from one file format to another file format. In some implementations, copy modules 920 may also, or alternatively, perform one or more data compression operations, such converting a WAV file into a ZIP file.

Memory 330 may store data received from copy modules 920, relay module 910, or one or more other modules or devices discussed herein. For example, memory 330 may store media files or session metadata received from copy modules 920. In some implementations, memory 330 may store data in an organized fashion, which may include using identifiers, indexes, tables, databases, or types of data organizing tools.

In certain implementations, memory 330 may assign a storage term status to stored data. A storage term status may indicate a duration of time that the data will be stored, which may be based on various factors, including internal data storage policies, an amount of remaining data storage capacity, a record order or other record request, a call plan, or other factors relating to storing data. Additionally, or alternatively, memory 330 may change a storage term status of stored data. Memory 330 may also, or alternatively, communicate data stored by memory 330 in accordance with a data request from another device, such as client device 205.

Export module 940 may be capable of receiving a request for data recorded by relay/record server 224 (e.g., a request for a media file). A request for data may originate from a variety of sources, including IVR recording system 220, external recording system 230, client device 205, or another type of device. As mentioned above, export module 940 may respond to such requests by communicating a data request or query to memory 330 and providing the requested data in accordance with the request received by the export module. In some implementations, export module 940 may be capable of providing the requested data in accordance with one or more of a variety of communication protocols and/or data security protocols.

FIG. 9B is a diagram of another example relay/record server 224 according to one or more implementations described herein. As illustrated, relay/record server 224 may include relay module 910, fork modules 950-1, . . . , 950-R (where R≥1) (referred to collectively as "fork modules 950," and individually as "fork module 950"), or originating agent modules (OAs) 960-1, . . . , 960-T (where T≥1) (referred to collectively as "OA modules 960," and individually as "OA module 960"). In some implementations, the modules depicted in FIG. 9B may be implemented using one or more modules of FIG. 3 or one or more modules of FIG. 4.

In addition, relay/record server 224 may include fewer modules, additional modules, different modules, or differently arranged modules than those illustrated in FIG. 9B. In another example, relay/record server 224 may include a communication module to receiving real-time recording commands from client device 205 or another computing device. In yet other implementations, the relay server 224 of FIG. 9B may include one or more of the modules of FIGS. 9A and/or 9C.

As described above with respect to FIG. 9A, relay module 910 may provide communication session relay services by serving as an end device (e.g., TUA) for one portion (e.g., a receive portion) of a communication session and as an OUA for another portion (e.g., a send portion) of the same communication session. In some implementations, relay module 910 may operate as a back-to-back user agent (B2BUA) or similar relay component, as discussed above with reference to FIG. 8.

Fork modules 950 may enable a communication session stream to be forked or otherwise duplicated. As illustrated, incoming communication session streams, along transport protocol paths, may be forked, split, or otherwise parsed to an external destination, such as external recording system 230. As illustrated, each forked communication session stream may include a signaling protocol (e.g., SIP) path, from OA modules 960, that may also, or alternatively, be sent to an external destination, such as external recording system 230.

Figure 9C:
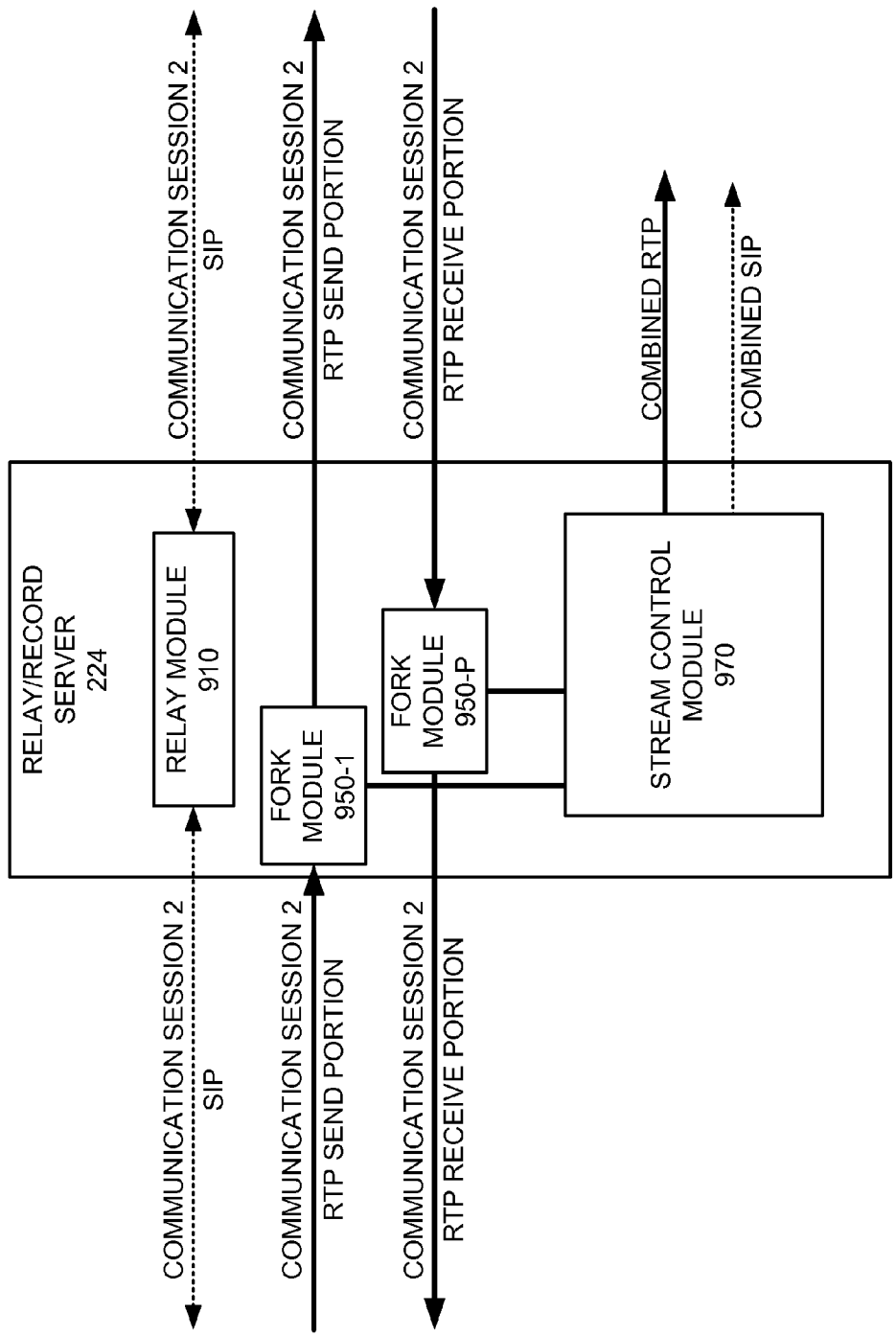

FIG. 9C is a diagram of another example relay/record server 224 according to one or more implementations described herein. As illustrated, relay/record server 224 may include relay module 910, fork modules 950-1, . . . , 950-P (where P≥1) (referred to collectively as "fork modules 950," and individually as "fork module 950"), and stream control module 970. In some implementations, the modules depicted in FIG. 9C may be implemented using one or more modules of FIG. 3 or one or more modules of FIG. 4.

In addition, relay/record server 224 may include fewer modules, additional modules, different modules, or differently arranged modules than those illustrated in FIG. 9C. In another example, relay/record server 224 may include a communication module to receiving real-time recording commands from client device 205 or another computing device. In yet other implementations, the relay server 224 of FIG. 9C may include one or more of the modules of FIGS. 9A-9B.

As described above with respect to FIGS. 9A-9B, relay module 910 may provide communication session relay services by serving as an end device (e.g., TUA) for one portion (e.g., a receive portion) of a communication session and as an OUA for another portion (e.g., a send portion) of the same communication session. In some implementations, relay module 910 may operate as a back-to-back user agent (B2BUA) or similar relay component, as discussed above with reference to FIG. 8.

Fork modules 950 may enable a communication session stream to be forked or otherwise duplicated. As illustrated, incoming communication session streams, along transport protocol paths, may be forked, split, or otherwise parsed to an external destination, such as external recording system 230. As illustrated, stream control module 970 may operate to control the information streamed to the external destination. For example, stream control module 970 may operate to only stream one of, or part of one of, the incoming communication session streams. In another example, control module 970 may combine two or more of, or parts of two or more of, the incoming communication session streams, and forward the combined communication streams to the external destination. As such, stream control module 970 may control the type, form, and/or content of information streamed to an external destination from IVR recording system 220.

In addition to communicating with the caller, the IVR recording system may be capable of operating in one or more recording modes. For example, as depicted in FIG. 1, the IVR recording system may be capable of operating in a non-record mode, a local record mode, and/or a streaming record mode. In a non-record mode, the IVR recording system may provide IVR-related services without recording some or all of the communication session. In a local record mode, the IVR recording system may provide IVR-related services and record some or all of the communication session locally. In the streaming record mode, the IVR recording system may provide IVR-related services and stream some or all of the communication to an external recording device.

In light of the above, IVR recording system 220 may be capable of providing recording capabilities according to the needs and/or preferences of surrounding systems or conditions. For example, in a network that does not include any recording capabilities, the IVR recording system may operate in a local record mode to provide recording capabilities to the network. In a network that provides one or more external recording systems, IVR recording system may operate in a streaming record mode so that communication sessions are recorded by one or more of the external recording systems. In another network, IVR recording system may transition from one recording mode to another recording mode in order to, for example, avoid recording certain communication sessions, record certain communication sessions locally, and/or stream certain communication sessions to external recording systems. Accordingly, one or more of the implementations described herein may provide solutions to recording communication sessions depending on the needs, preferences, or circumstances of surrounding networks or devices.

It will be apparent that example implementations, as described above, may be implemented in many different forms of software, firmware, and/or hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a "component" that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a computing device, a communication session invitation from a user device,
   determining, by the computing device, whether a communication session, corresponding to the communication session invitation, is to be recorded,
   when the communication session is to be recorded,
      identifying, by the computing device, a record mode, corresponding to the communication session, from a plurality of record modes, wherein the record mode comprises:
         a local record mode to record one or more portions of the communication session locally, or
         a stream record mode to stream one or more portions of the communication session to an external recording system,
      establishing, by the computing device, recording services corresponding to the record mode,
      establishing, by the computing device, the communication session with the user device, where establishing the communication session comprises routing a signaling path or a transport path, between the user device and the computing device, based on the record mode,
      receiving a request from a client device to transition to another record mode, wherein the other record mode is different from the record mode, and wherein the other record mode comprises:
         a non-record mode that does not include recording services,
         a local record mode to record one or more portions of the communication session locally, or
         a stream record mode to stream one or more portions of the communication session to the external recording system, and
      transitioning from the record mode to the other record mode based on the request from the client device, and
   when the communication session is not to be recorded,
      establishing, by the computing device, the communication session with the user device.

2. The method of claim 1, further comprising:
   providing interactive voice response services to the communication session when the communication session is to be recorded, and
   providing interactive voice response services when the communication session is not to be recorded.

3. The method of claim 1, further comprising:
   receiving one or more record orders from the client device, where:
      the one or more record orders comprise instructions for recording one or more communication sessions, and
      determining whether to record the communication session is based on the one or more record orders.

4. The method of claim 1, further comprising:
   receiving a record order from the client device, where:
      the record order comprises instructions for recording one or more communication sessions,
      the record order comprises instructions for recording one or more types of communication sessions,
      the record order comprises instructions for recording one or more communication sessions corresponding to a particular caller,
      the record order comprises instructions for recording one or more communication sessions corresponding to a particular type of caller,
      the record order comprises instructions for recording one or more communication sessions corresponding to a particular date or time,
      the record order comprises instructions for recording one or more communication sessions corresponding to a particular user device,
      the record order comprises instructions for recording one or more communication sessions corresponding to a particular type of user device,
      the record order comprises instructions for recording one or more communication sessions corresponding to a particular type of information provided to user devices, or
      the record order comprises instructions for recording one or more communication sessions corresponding to a particular type of information received from user devices, and
   where determining whether to record the communication session is based on a comparison of the communication session invitation and the record order.

5. The method of claim 1, where the communication session invitation corresponds to a session initiation protocol (SIP) INVITE message.

6. The method of claim 1, where:
   the plurality of record modes comprise:
      the local record mode to record the one or more portions of the communication session locally, and
      the stream record mode to stream the one or more portions of the communication session to the external recording system.

7. The method of claim 1, where establishing the recording services corresponding to the record mode and establishing the communication session with the user device, comprises:
   identifying two or more communication streams corresponding to the communication session,
   combining the two or more communication streams into a single communication stream, and
   streaming the single communication stream to an external recording system.

8. The method of claim 1, where establishing the recording services corresponding to the record mode and establishing the communication session with the user device, comprises:
   recording one or more portions of the communication session, and
   storing the one or more portions of the communication session locally.

9. The method of claim 1, where establishing the recording services corresponding to the record mode and establishing the communication session with the user device, comprises:
   identifying one or more communication session streams corresponding to the communication session,
   recording the one or more communication session streams, creating a media file based on the one or more communication streams, and
storing the media file.

10. The method of claim 1, where establishing the recording services corresponding to the record mode and establishing the communication session with the user device, comprises:
identifying two or more communication session streams corresponding to the communication session,
combining the two or more communication session streams corresponding to the communication session,
creating a media file based on the two or more communication streams, and
exporting the media file to the external recording system.

11. The method of claim 1, where:
when the communication session is to be recorded,
establishing the communication session comprises establishing a communication session routing path comprising an interactive voice response server and a record and relay server.

12. The method of claim 1, where:
when the communication session is not to be recorded, the method further comprises:
receiving a request from the client device to record the communication session; and
transitioning to the record mode based on the request from the client device.

13. A system, comprising:
an interactive voice response device to provide interactive voice response services to communication sessions, where:
the interactive voice response device is to:
receive a session invitation request from a user device,
determine whether a communication session, corresponding to the communication session invitation, is to be recorded,
when the communication session is to be recorded,
identify a record mode, corresponding to the communication session, from a plurality of record modes, wherein the record mode comprises:
a local record mode to record one or more portions of the communication session locally, or
a stream record mode to stream one or more portions of the communication session to an external recording system,
communicate the record mode to a record and relay server,
establish the communication session comprising a recording communication path that includes the interactive voice response device and the record and relay server,
receive a request from a client device to transition to another record mode, wherein the other record mode is different from the record mode, and wherein the other record mode comprises:
a non-record mode that does not include recording services,
a local record mode to record one or more portions of the communication session locally, or
a stream record mode to stream one or more portions of the communication session to the external recording system, and
transition from the record mode to the other record mode based on the request from the client device, and
when the communication session is not to be recorded,
establish a communication session comprising a non-recording communication path that includes the interactive voice response device and excludes the record and relay server.

14. The system of claim 13, where the session invitation request corresponds to a session initiation protocol (SIP) INVITE message.

15. The system of claim 13, where, when establishing the communication session, the interactive voice response device is configured to:
identify two or more communication streams corresponding to the communication session,
combine the two or more communication streams into a single communication stream, and
stream the single communication stream to an external recording system.

16. The system of claim 13, where, when establishing the communication session, the interactive voice response device is configured to:
record one or more portions of the communication session, and
store the one or more portions of the communication session locally.

17. One or more non-transitory computer-readable storage media, comprising:
one or more instructions that, when executed by a processor, cause the processor to receive a communication session invitation from a user device,
one or more instructions that, when executed by a processor, cause the processor to determine whether a communication session, corresponding to the communication session invitation, is to be recorded,
one or more instructions that, when executed by a processor, cause the processor to:
when the communication session is to be recorded,
establish the communication session with the user device,
where establishing the communication session comprises:
relaying the communication session via a relay and record server,
associating call context information corresponding to the communication session invitation to a call context associated with a relay invitation message used to relay the communication session via the relay and record server,
identifying two or more communication session streams corresponding to the communication session,
combining the two or more communication session streams corresponding to the communication session,
creating a media file based on the two or more communication streams, and
exporting the media file to an external recording system, and
when the communication session is not to be recorded,
establish the communication session with the user device.

18. The computer-readable storage media of claim 17, where the call context information comprises at least one of:
information describing interactive voice response services provided to the user device,
information indicating a current state of interactive voice response services being provided to the user device,
billing information corresponding to the user device, or information describing a recording status corresponding to the communication session.

19. The computer-readable storage media of claim 17, where, to establish recording services, the one or more instructions cause the processor to:
store the media file locally.

20. The computer-readable storage media of claim 17, where the communication session invitation corresponds to a session initiation protocol (SIP) INVITE message.

* * * * *